United States Patent Office 3,498,939
Patented Mar. 3, 1970

3,498,939
COATING COMPOSITIONS
Leon C. Schier, Milwaukee, Harold G. Bittle, Brookfield, and Arthur F. Rylander, Milwaukee, Wis., assignors to PPG Industries, Inc., Pittsburgh, Pa., a corporation of Pennsylvania
No Drawing. Continuation-in-part of application Ser. No. 506,583, Nov. 5, 1965. This application Jan. 16, 1969, Ser. No. 791,791
Int. Cl. C08f 29/20; C08g 37/20
U.S. Cl. 260—19                    12 Claims

ABSTRACT OF THE DISCLOSURE

Coating compositions comprising a heat-reactive phenolic resin and a vinylidene fluoride polymer provide coatings of improved properties, including a high degree of resistance to various chemicals and resistance to thermal degradation. An epoxidized oil is preferably included in some compositions. The compositions described are particularly useful for coating articles having both a ceramic surface and a metal portion.

---

This application is a continuation-in-part of application Ser. No. 506,583, filed Nov. 5, 1965 now abandoned.

Vinylidene fluoride polymers are produced by the free radical polymerization of vinylidene fluoride and have excellent chemical resistance and outstanding strength and flexibility. These properties make such polymers useful as films which may be employed as liners and protective coverings where resistance to chemical attack is desired. However, these polymers are not satisfactorily employed in coating compositions of conventional types to be applied by conventional means, because of their relative insolubility in organic solvents and because these polymers lack sufficient adhesion to most substrates.

It has now been found that coating compositions comprising both a heat-reactive phenolic resin and a vinylidene fluoride polymer can be easily applied to most surfaces to provide adherent coatings of highly desirable properties. For example, the coatings obtained from such coating composition have excellent hardness, adhesion, toughness and gloss, and are exceedingly resistant to various chemicals as well as to thermal degradation.

The compositions herein can be employed along with, if desired, organic solvents, pigments and additives, to provide formulated coating compositions suitable for application by spraying and other conventional techniques. These compositions, when cured by heating, result in extremely hard and adherent coatings which are outstandingly resistant to chemical attack.

The heat-reactive phenolic resin can be any of the phenol-aldehyde resins of this type which are commonly known and used in the art. The choice of particular reactants, reactant ratios, catalysts and polymerization conditions to achieve phenol-aldehyde condensation products having these properties are well known, and any such phenolic resin can be employed herein. The chief characteristic of these heat-reactive resins is that the condensation reaction between the phenol and the aldehyde has not been carried to the final non-reactive, thermoset state, and thus the resins are capable of further polymerization when heated.

In these resins, a phenol is condensed with an aldehyde, which is most often formaldehyde, although other aldehydes, such as acetaldehyde, furfural, etc., can also be employed. Methylene-releasing and aldehyde-releasing agents, such as paraformaldehyde and hexamethylenetetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols, such as the monobutenyl phenols containing a butenyl group in ortha, meta or para position, and where the double bond occurs in various positions in the hydrocarbon chain.

Generally, heat-reactive phenolic resins are produced by carrying out the reaction of the phenol with an excess of formaldehyde in the presence of an alkaline catalyst, such as sodium carbonate or ammonia. One preferred product for use in the invention herein is made in this manner from the alkaline-catalyzed reaction of a mixture of phenol and ortho-cresol with excess formaldehyde.

The vinylidene fluoride polymers herein are made by the free radical-initiated polymerization of vinylidene fluoride, using known techniques. A process for the production of vinylidene fluoride polymers is described, for example, in U.S. 3,193,539. The preferred vinylidene fluoride polymers employed in the invention are homopolymers of vinylidene fluoride, i.e., poly(vinylidene fluoride). However, other vinylidene fluoride polymers can be employed so long as the polymer contains a major proportion of vinylidene fluoride.

For most purposes, polymers containing about 95 percent or more of vinylidene fluoride are desired. Suitable comonomers include halogenated ethylenes such as 1,2-dichloro-1,2-difluoroethylene, 1,1,2-trifluoro-2-chloroethylene, tetrafluoroethylene, vinyl fluoride, and vinyl chloride, although in general any vinyl monomer copolymerizable with vinylidene fluoride can be employed to make copolymers useful in the invention. The term "vinylidene fluoride polymer" as employed herein refers to the homopolymer of vinylidene fluoride or its copolymers with minor amounts of comonomers as described above.

The proportions of the phenolic resin and the vinylidene fluoride polymer are not critical to operability, in the sense that a useful composition is obtained with even quite small amounts of either component. Each of the components can be employed alone to produce coating compositions, and the presence of even small amounts of the other component in each instance provides some improvement in certain properties of the composition produced.

However, in order to make the compositions having the desirable properties described herein, it is preferred that the composition contain from about 5 percent to about 90 percent of the vinylidene fluoride polymer and, conversely, from about 90 percent to about 5 percent of the phenolic resin, these proportions being based on the total of the two components specified. (The above percentages are by weight and are based on resin solids content, as are all parts and percentages herein, unless otherwise specified.) In compositions employed for certain particular applications, such as those utilized in coatings for ceramic surfaces and other specialized uses, it is desirable that the composition contain from about 7 percent to about 25 percent of the vinylidene fluoride polymer and from about 75 percent to about 93 percent of the phenolic resin, again based on the total of these two components.

In addition to the phenolic resin and vinylidene fluoride polymer, which are essential components of the vehicle of the coating compositions herein, the compositions may include, if desired, pigments and various solvents such as aliphatic and aromatic hydrocarbons, alcohols, esters, ketones and the like. The pigments that can be employed include those which are conventionally utilized in coating compositions, and which are chosen with reference to the intended use for the coating. Among these are carbon black, iron oxides, titanium dioxide, lead oxides, silica, metallic pigments and various color pigments and dyes. Fillers, curing catalysts, wetting agents, suspending agents, fungicides, and similar additive materials can also be included, as can small amounts of other resinous components, such as polyesters, natural and synthetic oils, epoxidized or oxirane-containing oils or resins, various vinyl polymers, amine-aldehyde resins, hydrocarbon or fluorocarbon resins, and the like.

One optional component which is often desirable in order to provide desired properties comprise the epoxidized oils, which are produced by epoxidizing the double bonds in drying and semidrying oils such as linseed oil, soybean oil, tung oil, etc. When an epoxidized oil is included in the composition, it can be employed in varying amounts, but the preferred level is from about 2 to about 15 percent of the total of the vehicle solids.

The coating compositions described herein can be applied by any suitable method, including conventional techniques such as brushing, roll coating, spraying and the like, to surfaces of varying types. These can include, for example, siliceous surfaces including ceramics and glass, as well as wood, steel, aluminum and other metals, and various other surfaces to which protective coatings are desirably applied. The coatings are cured by heating at elevated temperatures, for example, at 200° F. to 500° F. for periods ranging from several minutes to several hours. The time and temperature of curing are correlated, and depend to some extent on the resins or other components, the pigments and other additives, if any, and the nature of the substrate.

The particular advantageous properties of the present compositions make them particularly useful for coating certain types of articles requiring coatings having properties which are difficult to obtain with known coating compositions. These include, for example, articles comprising both a ceramic surface and a metal portion, such as are found in certain types of resistors and similar articles. In many cases, these articles are not only difficult to satisfactorily coat but the coatings must retain their good properties during further processing. The compositions herein are especially suitable for many such applications.

In one example of the production and use of the coating compositions of the invention, there was utilized a poly(vinylidene fluoride) dispersion in dimethyl phthalate, known as "Kynar 1875G." The poly(vinylidene fluoride) was understood to have a melting point of 340° F., a refractive index of 1.42, a molecular weight of approximately 600,000 and a plasticity number (as described in U.S. 3,193,539) of about 1800. The poly(vinylidene fluoride) dispersion was employed along with a heat-reactive, 100 percent solids phenolic resin made from the alkaline-catalyzed reaction of a 1 to 1 mixture of phenol and ortho-cresol with excess formaldehyde. This resin had a specific gravity of 1.235 and a softening point (Dennis bar) of 185° F. In producing the coating composition, the following were mixed in a ball-mill:

| | Parts by weight |
|---|---|
| Phenolic resin described above | 282 |
| Xylene | 270 |
| Butanol | 150 |
| Red iron oxide | 90 |
| Suspending agent (dimethyldioctadodecyl ammonium bentonite) | 1 |

The dispersion was removed from the mill, which was then washed out with 12 parts of xylene and 9 parts of butanol, and the washings added to the mixture. This mixture was then thoroughly blended with 68 parts of the above poly(vinylidene fluoride) dispersion, containing 40 percent by weight of solid polymer dispersed in dimethyl phthalate. The resulting composition had a solids content of about 45 percent and viscosity of 80 to 100 seconds (No. 4 Ford cup).

The advantageous properties of the compositions of the invention were demonstrated with the foregoing composition by reducing 3 parts of the composition with 1 part of methylethyl ketone, and spraying the composition on a ceramic resistor coated with a carbon film and capped on each end with a bronze cap. The resistor was then baked for 90 minutes at 350° F. A continuous finish was obtained with excellent adhesion, toughness and gloss. The coating had outstanding hardness as well, being harder than a 9H pencil hardness.

The outstanding chemical resistance properties of the coating was shown by further processing of the resistor, in which the coated resistor was placed in an injection mold, coated with powdered epoxy resin, and heated at 350° F. for three minutes. The coating under this treatment did not degrade or dissolve, and the resulting encapsulated article was suitable for use in various electronic applications.

Similar results are obtained in the foregoing manner by employing other phenol-aldehyde resins of the class described in place of the phenolic resin utilized above. For example, the phenolic resin can be made from a p-tert-butyl phenol or from phenol alone. Similarly, other vinylidene fluoride polymers can be used in the same manner, and the compositions can be formulated with other solvents, pigments and additives, depending upon the application method and use to which the product is to be put. One example of a vinylidene fluoride copolymer is a copolymer of vinylidene fluoride with 5 mole percent of symmetrical difluorodichloroethylene. Also, other surfaces as well as other types of articles can be coated in the manner described to provide surface coatings of excellent properties.

As indicated above, it is desirable in certain instances to include an epoxidized oil in the coating composition. For example, there can be added to the composition described above 16 parts of epoxidized soybean oil; the resultant composition provides coatings with increased adhesion and higher gloss.

According to the provisions of the patent statutes, there are described above the invention and what are now considered to be its best embodiments. However, it is to be understood that within the scope of the appended claims, the invention can be practiced otherwise than as specifically described.

We claim:

1. A coating composition comprising (a) a heat-reactive phenolic resin and (b) a vinylidene fluoride polymer containing at least about 95 percent by weight vinylidene fluoride.

2. The coating composition of claim 1 in which said phenolic resin is a heat-reactive phenol formaldehyde resin and said vinylidene fluoride polymer is poly(vinylidene fluoride).

3. The coating composition of claim 2 in which said phenolic resin is an alkaline-catalyzed condensation product of formaldehyde and a mixture of phenol and ortho-cresol.

4. The coating composition of claim 1 in which an epoxidized drying or semidrying oil is present as an additional component.

5. The coating composition of claim 4 in which said epoxidized oil is epoxidized soybean oil.

6. A coating composition comprising pigment, organic solvent and a vehicle consisting essentially of (a) a heat-reactive phenolic resin and (b) a vinylidene fluoride polymer containing at least about 95 percent by weight of vinylidene fluoride.

7. The coating composition of claim 6 in which said phenolic resin is an alkaline-catalyzed condensation product of a phenol and excess formaldehyde and said vinylidene fluoride polymer is poly(vinylidene fluoride).

8. The coating composition of claim 6 in which said vehicle contains from about 75 to about 93 percent of said phenolic resin, and from about 7 to about 25 percent of said vinylidene fluoride polymer, based on the total weight of phenolic resin and vinylidene fluoride polymer.

9. The coating composition of claim 6 in which from about 2 to about 15 percent by weight, based on the total resinous vehicle, of an epoxidized drying or semidrying oil is present.

10. An article comprising a solid surface having thereon a cured adherent layer of the coating composition of claim 1.

11. The article of claim 10 in which said surface is a ceramic surface.

12. The article of claim 10 in which said surface is a metal surface.

References Cited

UNITED STATES PATENTS

| | | | |
|---|---|---|---|
| 2,384,885 | 9/1945 | Britton et al. | 260—847 |
| 2,384,947 | 9/1945 | Matheson | 260—847 |
| 2,435,537 | 2/1948 | Ford et al. | 260—92.1 |
| 2,462,678 | 2/1949 | Roedel | 260—92.1 |
| 2,888,446 | 5/1959 | Herbst | 260—92.1 |
| 3,193,539 | 7/1965 | Hauptschein | 260—92.1 |

OTHER REFERENCES

Schildknecht: "Vinyl and related polymers," 1952, John Wiley and Sons, New York.

DONALD E. CZAJA, Primary Examiner

W. E. PARKER, Assistant Examiner

U.S. Cl. X.R.

260—33.4, 33.6, 38, 41, 92.1, 84.7; 117—145, 161